(12) United States Patent
Wencslao

(10) Patent No.: US 8,498,738 B2
(45) Date of Patent: Jul. 30, 2013

(54) METHODS TO BROADCAST STATUS OF A SELF-SERVICE DISPENSING DEVICE

(75) Inventor: Rex M. Wencslao, Cebu (PH)

(73) Assignee: NCR Corporation, Duluth, GA (US)

( * ) Notice: Subject to any disclaimer, the term of this patent is extended or adjusted under 35 U.S.C. 154(b) by 165 days.

(21) Appl. No.: 12/974,845

(22) Filed: Dec. 21, 2010

(65) Prior Publication Data

US 2012/0158172 A1   Jun. 21, 2012

(51) Int. Cl.
*G06F 17/00* (2006.01)

(52) U.S. Cl.
USPC ............ 700/241; 700/244; 700/236; 700/237

(58) Field of Classification Search
USPC .................................. 700/236, 237, 241, 244
See application file for complete search history.

(56) References Cited

U.S. PATENT DOCUMENTS

| | | | | |
|---|---|---|---|---|
| 5,339,250 | A * | 8/1994 | Durbin ........................ | 700/237 |
| 5,844,808 | A * | 12/1998 | Konsmo et al. .............. | 700/244 |
| 6,259,956 | B1 * | 7/2001 | Myers et al. ................. | 700/80 |
| 6,694,217 | B2 * | 2/2004 | Bloom ........................ | 700/215 |
| 7,139,616 | B2 * | 11/2006 | May et al. ................... | 700/9 |
| 7,444,296 | B1 * | 10/2008 | Barber et al. ................ | 705/17 |
| 7,499,768 | B2 * | 3/2009 | Hoersten et al. ............. | 700/236 |
| 7,593,897 | B1 * | 9/2009 | Kolls .......................... | 705/39 |
| 7,747,346 | B2 * | 6/2010 | Lowe et al. .................. | 700/242 |
| 7,787,987 | B2 * | 8/2010 | Kuehnrich et al. ........... | 700/241 |
| 7,797,077 | B2 * | 9/2010 | Hale ........................... | 700/236 |
| 8,060,247 | B2 * | 11/2011 | Kaplan et al. ............... | 700/240 |
| 2002/0046122 | A1 * | 4/2002 | Barber et al. ................ | 705/17 |
| 2004/0254676 | A1 * | 12/2004 | Blust et al. .................. | 700/231 |
| 2008/0004748 | A1 * | 1/2008 | Butler et al. ................. | 700/244 |
| 2008/0125906 | A1 * | 5/2008 | Bates et al. .................. | 700/241 |
| 2009/0069934 | A1 * | 3/2009 | Newman et al. ............. | 700/239 |
| 2010/0138037 | A1 * | 6/2010 | Adelberg et al. ............ | 700/241 |

* cited by examiner

*Primary Examiner* — Michael K Collins

(74) *Attorney, Agent, or Firm* — Robert S. Chee; Michael Chan

(57) ABSTRACT

A method is provided to that allows for the broadcast the status of a self-service dispensing device that a user is likely or scheduled to visit. A diagnostic program may be installed on a self-service dispensing device and/or a central server. The diagnostic program monitors the health and status of the self-service dispensing device. If a problem is detected by the diagnostic program, the self-service dispensing device or the central server proactively contacts likely visitors to the device as well as creates a service call to support personnel in order to have the problem repaired.

17 Claims, 3 Drawing Sheets

METHODS TO BROADCAST STATUS OF A SELF-SERVICE DISPENSING DEVICE

FIELD OF THE INVENTION

The present invention relates generally to self-service dispensing devices.

BACKGROUND

The methods in which consumers purchase or obtains items continually evolves. This may be seen, for example, in the area of procuring media content for private use. As used herein, media content may refer to, but is not limited to, motion pictures, television programs, sporting events, music, video games, or concerts. With the widespread adoption of the VHS video cassette recorder, retailers opened whose sole purpose was to lease or sell media content to consumers at commercial retail locations. This continued with the adoption of the digital versatile disc (DVD) player and the Blu-ray™ disc player.

Leases and purchases of media content have since moved to alternate delivery methods. For example, a self-service media content dispensing device, such as a kiosk, offers users the advantages of a self-service device where the user operates and completes the transaction. For the service provider of the dispensing device, advantages are realized by operating a device with a small footprint and avoiding the overhead of a retail establishment. As these self-service dispensing devices become more popular, methods and techniques to improve the consumer experience with these self-service devices becomes more important.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided to broadcast the status of a self-service dispensing device that a user is likely or scheduled to visit.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
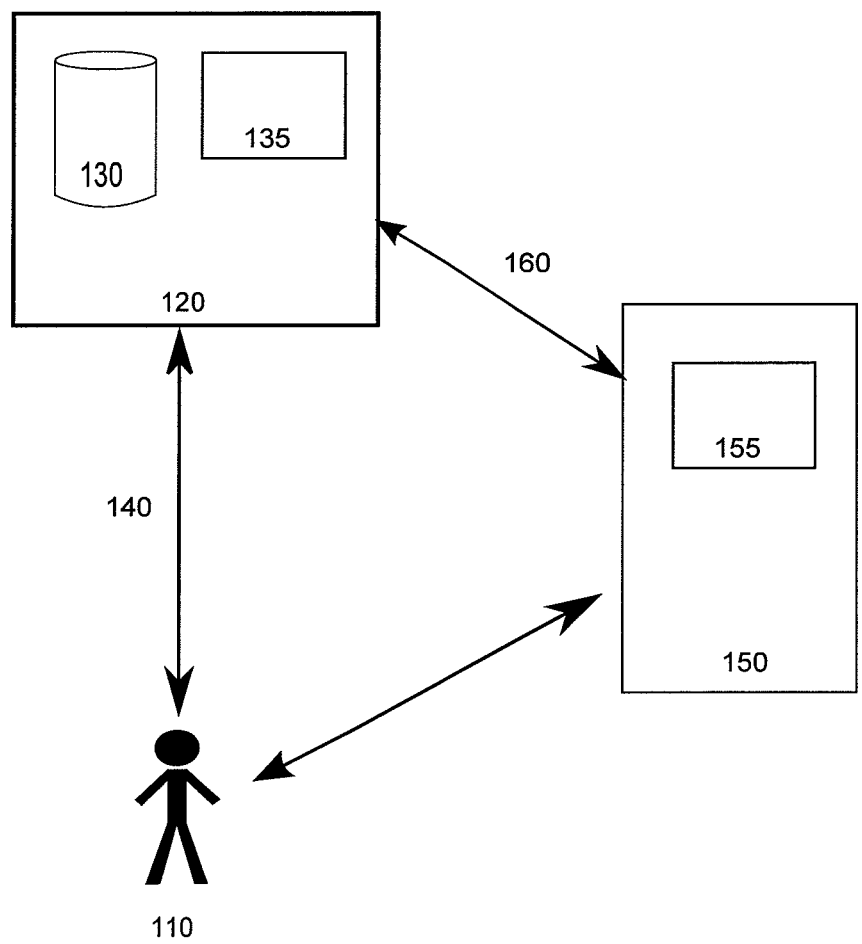
FIG. 1 is a block illustration of a system for broadcasting status of a self-service dispensing device, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described to broadcast the status of a self-service dispensing device, or kiosk. The self-service dispensing device is preferably a touch-based computing dispensing device, such as a self-service kiosk that a user may operate through a graphical user interface on a display, and performing selections by touching a particular icon or symbol on the screen. Other methods of selection may be employed such as depressing a particular button in proximity to the display or through the use of a mouse. Any method of operation for the kiosk may be used and may vary from implementation to implementation.

One issue that may be encountered at a self-service dispensing device is that users may encounter a self-service dispensing device that is in some respect non-operational and unable to dispense the item desired by the user. This is especially disconcerting when the selections have been previously reserved and paid in advance by the user for pick-up at a particular dispensing device with advanced reservations. Advanced reservations allow a user to pre-select and pay for a particular item that may be in limited supply, such as a new release of a DVD, so that the item will be available once the user visits the dispensing device.

Advanced reservations of items may be encountered at devices that dispense media content stored on digital media storage devices, including, but not limited to an SD card, a USB flash drive, a portable hard drive, a DVD, a Blu-ray™ disc, a CD, or a solid-state drive. In advanced reservations, a user may log into an account on the Internet that is associated with an operator of the media content dispensing device (e.g. Blockbuster Express®, etc.). The user may search for a particular title that he desires to see if the particular title is available at a kiosk at a certain location. If the particular title is available, the user may reserve the title by paying the rental fee of the particular title of media content for one night. The user may then visit the kiosk at the certain location to pick up the reserved media content until a predetermined deadline (e.g., midnight of the same night). If the user fails to pick up the rental by the deadline, the user forfeits the rental fee and the particular media content becomes available for rental by any user.

Consumers may become extremely dissatisfied if the user is unable to pick up a reserved media content that has already been prepaid. This may occur for a variety of reasons. For example, the kiosk at the certain location may become non-operational for any a variety of reasons. Vandalism may have occurred or the robot gripper that picks up and dispenses the media content inside the dispensing device may require service. There may not be a diagnostic program monitoring the dispensing device. Under this circumstance, the dispensing device might appear to be operational to the user when advanced reservations are made. However, the dispensing device in the field is actually non-operational. This is troublesome when the error on the dispensing device occurs as the user is on his way to pick up the media content. There is no possible way for the user to obtain the reserved media content and the user must now contact customer service representatives of the dispensing device operator in order to alert them regarding the problem and to request a refund. Thus, methods to inform the user of a dispensing device malfunction prior to the user leaving for the dispensing device and to provide the user other options are offered.

In an embodiment, a diagnostic program is installed on a self-service dispensing device. The diagnostic program monitors the health and status of the self-service dispensing device. In an embodiment, if a problem is detected by the diagnostic program, the self-service dispensing device contacts likely visitors to the device as well as creates a service call to support personnel in order to have the problem repaired.

By devising methods that inform a user that the selected item at the particular dispensing device is not available (due to problems on the self-service dispensing device), the user may be given other options to retrieve the item at other locations or offered a refund on their selection. Thus, user dissatisfaction may be alleviated as the user is given some advance notice and options when the dispensing device is not available.

The Self-Service Dispensing System

In an embodiment, a user may wish to purchase or lease an item from a self-service dispensing device. An operating company may place a number of self-service dispensing devices throughout an area. The self-service dispensing devices may comprise, among other things, a network connection that may connect to a central server. The self-service dispensing devices store and dispense items for sale or lease, such as media content. The items sold or leased may vary widely and includes, but is not limited to, candies, health related items, cell phones, electronics, soft drinks, ice cream, and media content.

In an embodiment, each self-service dispensing device is connected through the network connection to the central server. The server is a central repository that may store all transactional data on each self-service dispensing device. Other data such as profile data for users, financial data, and maintenance data may also be stored with the central server. The central server may comprise a database, and a network connection to connect to each self-service dispensing device.

In an embodiment, the central server may also comprise a web server to handle requests by users for reservations for items within a self-service dispensing device. For example, a user may wish to reserve the DVD, "Toy Story 3" from a self-service dispensing device located close to the user's place of work. The user would log onto the website of the operator of the dispensing devices (e.g. "Blockbuster Express", etc.) and determine whether the DVD "Toy Story 3" is available at his desired self-service dispensing device. If so, the user may pay a daily rental fee in order to reserve the DVD, and have until a predetermined deadline in order to pick up the DVD at the desired self-service dispensing device. The central server transmits the request to the particular self-service dispensing device to hold a "Toy Story 3" DVD for the user when he arrives.

When the user arrives at the device, the user may select the option to pick up a previously reserved DVD. The user then enters a form of identification (e.g. credit card used to reserve the DVD, etc.). The self-service dispensing device identifies the user and sees that the user has requested the DVD, "Toy Story 3." The self-service dispensing device then dispenses the DVD and the transaction is completed. The self-service dispensing device then transmits the transaction data to the central server that the reservation has been completed.

The Diagnostic Program

In an embodiment, a diagnostic program is installed onto each self-service dispensing device in order to monitor the health and status of each self-service dispensing device. In an embodiment, if a problem is detected by the diagnostic program, the self-service dispensing device contacts likely visitors to the device as well as creates a service call to support personnel in order to have the problem repaired.

In an embodiment, problems may be detected in a variety of ways. For example, the self-service dispensing may be vandalized such as the display being broken or the dispensing slot of the device being blocked. Under this circumstance, the diagnostic program would detect the broken display or inoperable slot and send an error message to the central server in order to summon a repair person and to inform any user who has made a reservation at the device. The same might occur if there was a device-related issue. For example, the gripper that moves the items to the output slot might break or an item might not be placed in the slot correctly and also cause the device to malfunction. The diagnostic program would detect such faults and send an error message to the central server and to users with reservations at the device.

The diagnostic program installed on the dispensing device may not detect all of errors that may occur at the device. In an embodiment, a diagnostic program is also installed on the central server. The central server may then help detect errors that a diagnostic program installed only on the self-service dispensing device would fail to detect. For example, the self-service dispensing device might lose all power. Under this circumstance, the self-service dispensing device would not be able to send any error message to any outside source.

The diagnostic program installed on the central server may monitor all of the self-service dispensing devices. This may be performed by periodically polling each self-service dispensing device at a predetermined time period. In another embodiment, the central server may poll a particular self-service dispensing device when a request is made to reserve a particular item at the particular self-service dispensing device. When the diagnostic program installed on the central server does not receive any response from the self-service dispensing device, then an error may be detected. This error detection (from no response from the self-service dispensing device) leads to contacting users who are likely to visit the malfunctioning self-service dispensing device. Any error that may not allow the diagnostic program on the self-service dispensing device to broadcast an error may be detected by the diagnostic program on the central server. A fault on the network connection, a complete shutdown of the self-service dispensing device, or an error with the diagnostic program on the self-service dispensing device itself are examples of errors that may not be found by the diagnostic program on the dispensing device only. However, the faults listed are only examples and the actual number of faults may vary widely.

Broadcasting the Error Message

In an embodiment, when an error is reported by the self-service dispensing device or by the central server that results in non-operation of the dispensing device, a message may be sent to users who have previously reserved an item at the malfunctioning dispensing device. The message may be sent in a variety of ways. For example, the message may be sent as a short message service (SMS) text message, as an email, or as a voice call.

In an embodiment, when an error is detected at a self-service dispensing device, a message may also be sent to a service technician in order to have the dispensing device repaired. The message may be directed to a particular service technician if the error detected requires special handling. The message to the technician may include the location of the self-service dispensing device, the error encountered, and what the device was performing at the time of the error detection. Thus, service is ordered for the self-service dispensing device as the error is encountered and is not subject to a complaint from a user to customer support.

In an embodiment, the broadcast message to users is not limited to only those users who have a reservation for a particular item at the dispensing device. For example, users in their user profile might indicate a favorite self-service dispensing device. The users may wish to receive messages when their favorite self-service dispensing device becomes non-operable. Under this circumstance, when an error is detected in the favorite self-service dispensing device, these users will also receive a message that the dispensing device is not working and offer the location of the next nearest dispensing device.

In an embodiment, the message sent to users who have previously reserved an item may contain options that the user may follow in order to fulfill his request. For example, the message may allow the user to change the self-service dispensing device where he would pick up the item. The item reserved may be searched for in available inventory of other self-service dispensing devices closest in distance to the malfunctioning dispensing device to find alternative pick-up locations for the user. Other options for the user may also include a refund of his reservation fee, or to rollover his reservation fee so that he may pick up the item the next day instead.

In an embodiment, the broadcasting of the error message may originate from the central server. This may occur if the diagnostic program installed on the dispensing device detected an error and communicated the error to the central server. This may also occur if the diagnostic program installed on the central server detected an error by not receiving any response from the self-service dispensing device.

In another embodiment, the broadcasting of the error message may originate from the self-service dispensing device. The self-service dispensing device may have a direct network connection to the Internet in order to send out the error message. In an embodiment, a connection to a cellular network may also be installed on the self-service dispensing device and the cellular network is used directly in order to broadcast error messages.

ILLUSTRATED EXAMPLE

An example of an embodiment of the system is illustrated in FIG. 1. In FIG. 1, user 110 may submit requests for reservations for an item to server 120. Server 120 comprises storage device 130 and web server 135. The request from user 110 is submitted from a laptop, computer, mobile device, telephone, or any other communications computing device via network link 140. Network link 140 may comprise a cellular phone network link, a network link through the Internet, or any other type of network link upon which network communications may be sent. Once the server 120 receives the request, the server 120 communicates with a self-service dispensing device 150 via network link 160 to confirm that the dispensing device 150 is working and has the item available. Self-service dispensing device 150 comprises, among other things, display device 150 and storage for the items (not shown). Once the reservation is complete, the server 120 instructs the self-service dispensing device 150 to hold the item for the user 110.

The self-service dispensing device 150 may encounter an error prior to the time when the user 110 arrives to pick up his item. The self-service dispensing device 150 communicates with the server 120 the error and the server 120 transmits a message to the user 110 that the dispensing device is non-operable and providing options for the user. The server 120 may also poll the health of the self-service dispensing device 150 and detect errors in cases where the self-service dispensing device 150 may not be able to communicate errors to the server 120. Upon discovery of an error that causes the self-service dispensing device 150 to become non-operable, the server 120 or the dispensing device 150 itself broadcasts messages to user 110 that the dispensing device 150 is unavailable and offers other options to pick up the item or to cancel and refund the previous reservation. Messages may also be sent to other users who may use the self-service dispensing device. Another message may also be sent to a service technician in order to initiate repairs on the dispensing device. The actual architecture may vary from implementation to implementation and is not limited to those shown or described herein.

Figure 2:
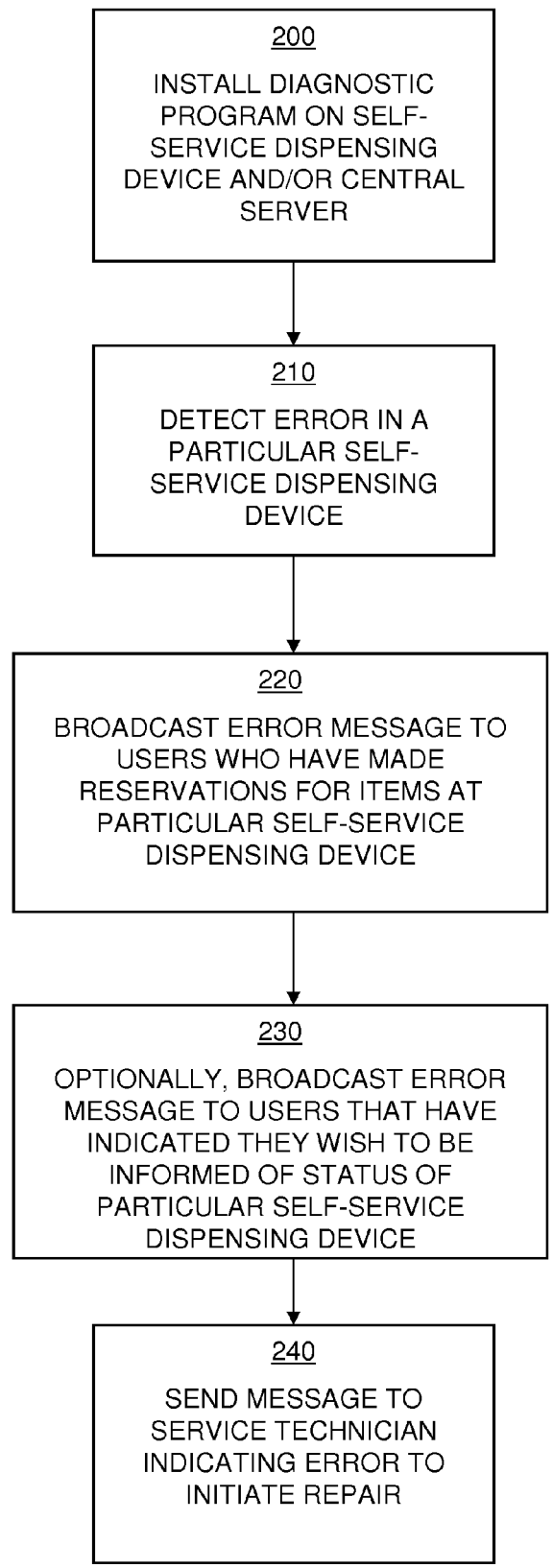
FIG. 2 is an illustration of a workflow for broadcasting the status of a self-service device, according to an embodiment of the invention.

FIG. 2 illustrates steps performed in order broadcast status of a self-service dispensing device to users. In step 200, a diagnostic program is installed and configured on a self-service dispensing device and/or a central server. Next, the diagnostic program at the self-service dispensing device and/or the central server detects an error that causes the self-service dispensing device to become non-operable in step 210. In step 220, the central server or the self-service dispensing device broadcasts a message to users who have made reservations for items at the dispensing device that the dispensing device is not operable and provides options for the user to fulfill or cancel his request. Optionally, the central server or the self-service dispensing device broadcasts a message to users who indicate that they wish to be informed of status of the dispensing device that the dispensing device is not operable in step 230. Finally, the central server or self-service dispensing device also sends a message to a service technician in order to initiate repairs for the self-service dispensing device in step 240.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
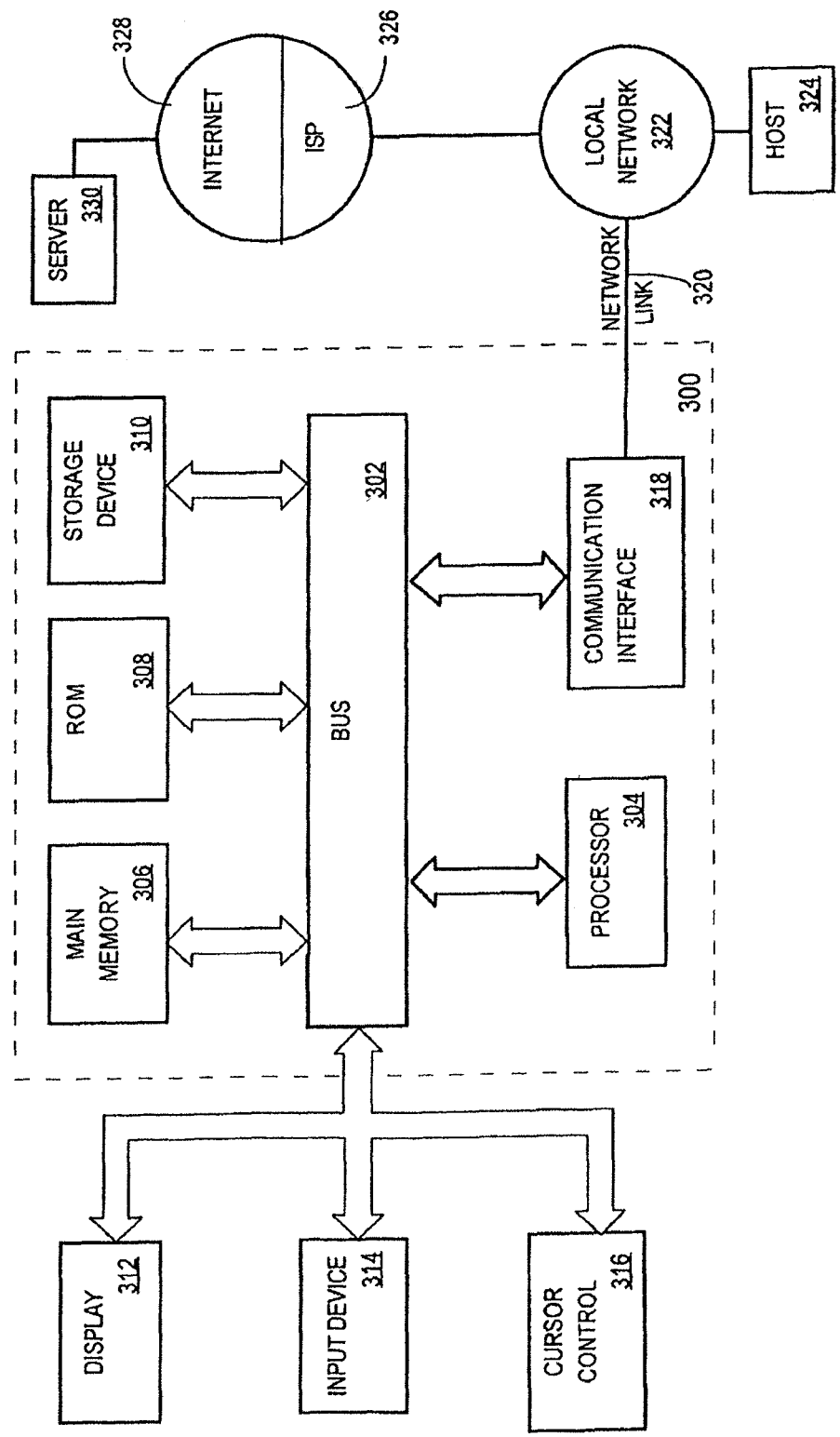
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operating a server operatively connected to a plurality of self-service dispensing devices, the method comprising:
receiving a request from a user who is at a first location to reserve a particular item at a particular self-service dispensing device at a second location which is different and remote from the first location;
transmitting the request to the particular self-service dispensing device at the second location;
receiving an indication that an error has occurred on the particular self-service dispensing device at the second location causing the particular self-service dispensing device to be unable to dispense the particular item; and
transmitting a message to a user device separate from the plurality of self-service dispensing devices indicating to the user who is later at a third location which is other than the second location and which is different and remote from the first location that the particular self-service dispensing device at the second location is unable to provide the particular item to the user.

2. The method of claim 1, wherein the indication that an error has occurred is performed by a diagnostic program installed on the particular self-service dispensing device.

3. The method of claim 1, wherein the indication that an error has occurred is performed by a diagnostic program installed on the server.

4. The method of claim 1, wherein the message to the user further comprises an option to request a refund and data that indicates other self-service dispensing devices that are able to provide the item.

5. The method of claim 3, wherein the diagnostic program on the server polls the particular self-service dispensing device to determine if there is an error with the particular self-service dispensing device.

6. The method of claim 1, further comprising transmitting a message to a service technician indicating the error of the particular self-service dispensing device to initiate repair.

7. A method of operating a self-service dispensing device, the method comprising:
receiving from a server, a request that each of a plurality of users has reserved a corresponding particular item in available inventory;
receiving from the server, a request that each of the plurality of users desires to be notified of status of the particular self-service dispensing device;
determining that an error has occurred causing the particular self-service dispensing device to be unable to dispense the particular items to the plurality of users; and
broadcasting a message to a plurality of user devices separate from the particular self-service dispensing device to notify each of the users that the particular self-service dispensing device is unable to provide the corresponding particular item to the user.

8. The method of claim 7, wherein determining that an error has occurred is performed by a diagnostic program installed on the particular self-service dispensing device.

9. The method of claim 7, wherein broadcasting the message is first transmitting the message to the server, and the server broadcasting the message to each of the plurality of users.

10. The method of claim 7, wherein the message to each of the plurality of users further comprises an option to request a refund and data that indicates other self-service dispensing devices that are able to provide the item.

11. The method of claim 7, wherein broadcasting the message is directly from the particular self-service dispensing device.

12. The method of claim 7, further comprising transmitting a message to a service technician indicating the error of the particular self-service dispensing device to initiate repair.

13. One or more storage media storing instructions which, when executed by one or more computing devices, cause performance of the method recited in claim 1.

14. One or more storage media storing instructions which, when executed by one or more computing devices, cause performance of the method recited in claim 7.

15. A system comprising:
one or more self-service dispensing devices; and
a server;
wherein (i) a first diagnostic program is installed and configured on at least one self-service dispensing device, (ii) a second diagnostic program installed and configured on the server for monitoring the one or more self-service dispensing devices for errors, (iii) a particular self-service dispensing device of the one or more self-service dispensing devices communicating with the server of any errors found by the first diagnostic program, and (iv) the server transmitting a message to one or more separate user devices of the one or more users who have previously reserved an item for pick up on the particular self-service dispensing device, the message comprising information for indicating the particular self-service dispensing device has experienced an error and/or is now unable to dispense the previously reserved item and instructions the one or more users to fulfill or cancel the reservation.

16. The system of claim 15, wherein the message further comprises an option to request a refund and data that indicates other self-service dispensing devices that are able to provide the item.

17. The system of claim 15, further comprising the server transmitting a message to a service technician indicating the error of the particular self-service dispensing device to initiate repair.

* * * * *